United States Patent
Chan et al.

(10) Patent No.: US 11,068,461 B1
(45) Date of Patent: Jul. 20, 2021

(54) MONITORING KEY ACCESS PATTERNS FOR NONRELATIONAL DATABASES

(71) Applicant: Amazon Technologies, Inc., Seattle, WA (US)

(72) Inventors: Wan Man Ryan Chan, Seattle, WA (US); Akhilesh Mritunjai, Seattle, WA (US); Adel Gawdat, Seattle, WA (US); Yogesh Kansal, Bellevue, WA (US); Richard Krog, Bainbridge Island, WA (US); Tushar Rakheja, Seattle, WA (US); Jason Kroll, Seattle, WA (US); Xi Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 16/452,434

(22) Filed: Jun. 25, 2019

(51) Int. Cl.
  *G06F 17/30* (2006.01)
  *G06F 16/22* (2019.01)
  *G06F 16/26* (2019.01)

(52) U.S. Cl.
  CPC .......... *G06F 16/2282* (2019.01); *G06F 16/26* (2019.01)

(58) Field of Classification Search
  CPC ........ G06F 16/13; G06F 16/24; G06F 16/156; G06N 3/00; G06N 5/00; G05B 13/00
  See application file for complete search history.

(56) References Cited

U.S. PATENT DOCUMENTS

| | | | | |
|---|---|---|---|---|
| 2004/0267800 | A1* | 12/2004 | Gupta | G06F 16/282 |
| 2013/0332608 | A1* | 12/2013 | Shiga | G06F 9/5088 709/226 |
| 2017/0004110 | A1* | 1/2017 | Bhattacharjee | G06F 16/217 |

* cited by examiner

*Primary Examiner* — Hung D Le
(74) *Attorney, Agent, or Firm* — Nicholson De Vos Webster & Elliott LLP

(57) ABSTRACT

Techniques are described for monitoring and enabling access to information about key access patterns for nonrelational database tables managed by a nonrelational database service of a service provider network. Storage nodes store data as key-value pairs (or key-document pairs), where the records or documents of a database are addressed by a unique key for each record. The storage nodes over time receive requests to perform various operations (for example, to get, put, update, or delete data in a table) associated with records stored by the storage nodes. The storage nodes collect information indicating a frequency with which such requests are received for each key for which a storage node is responsible. This frequency information for each key can be normalized relative to a maximum frequency supported by the storage nodes to obtain an access frequency score, where the maximum frequency indicates a frequency at which additional requests to the storage node may be throttled.

20 Claims, 9 Drawing Sheets

MONITORING KEY ACCESS PATTERNS FOR NONRELATIONAL DATABASES

BACKGROUND

Relational databases, which model data as rows and columns in a series of tables, have long been a dominant form of data organization and storage. However, various types of nonrelational databases have become increasingly popular in recent decades. At a high level, a nonrelational database provides for the storage and retrieval of data using data structures other than the tabular relations traditionally used in relational database systems. For example, one type of nonrelational database is based on key-value data structures, where data is represented as a collection of key-value pairs such that each possible key appears at most once in a data collection. Records in such databases are then stored and retrieved using the keys that uniquely identify each record, where a record can in turn include various types of fields and associated data. Another similar nonrelational database structure is a document store, where each "document" stored in the database encapsulates and encodes data and is similarly addressed in the database via a unique key. For many types of applications and use cases, the characteristics of such nonrelational databases can greatly improve scalability and provide superior performance compared to traditional relational databases.

BRIEF DESCRIPTION OF DRAWINGS

Various embodiments in accordance with the present disclosure will be described with reference to the drawings, in which.

DETAILED DESCRIPTION

Figure 1:
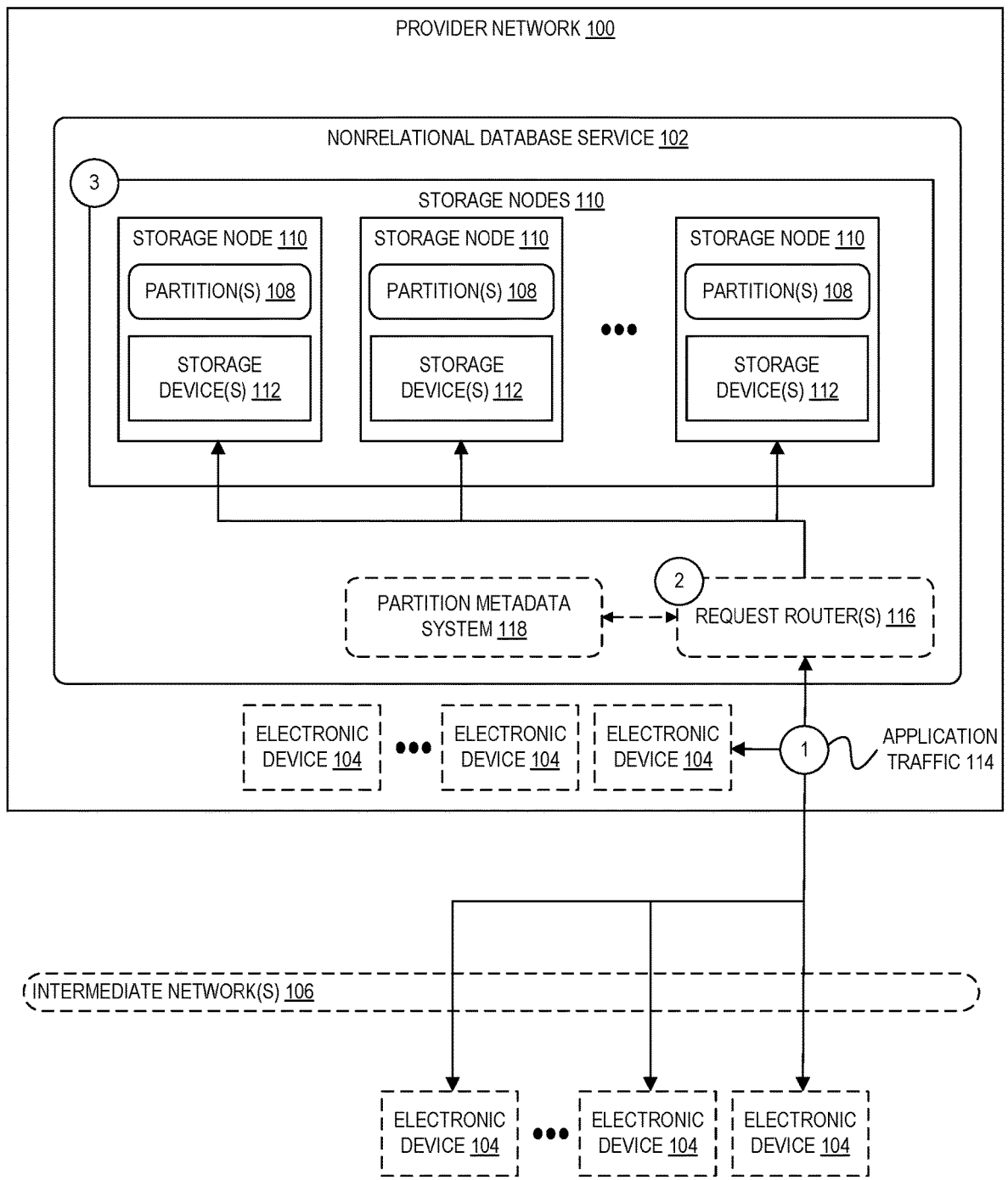
FIG. 1 is a diagram illustrating an environment for monitoring key access patterns for nonrelational databases managed by a nonrelational database service according to some embodiments.

The present disclosure relates to methods, apparatus, systems, and non-transitory computer-readable storage media for monitoring and enabling user access to information about key access patterns for nonrelational database tables managed by a nonrelational database service of a service provider network. According to some embodiments, storage nodes of a nonrelational database service store data as key-value pairs (or key-document pairs), where the records or documents of a database are addressed by a unique key for each record. The storage nodes over time receive requests to perform various operations (for example, to get, put, update, or delete data in a table) associated with records stored by the storage nodes. In some embodiments, the storage nodes collect statistical data indicating a frequency with which such requests are received for each key for which a storage node is responsible. The statistical data collected for each key can be further used to calculate a normalized value relative to a maximum key access frequency supported by the storage nodes, where this normalized value may be referred to as a "frequency score." Here, a maximum key access frequency indicates a frequency limit above which additional requests to the storage node may be throttled, for example, because the underlying storage devices or other hardware may not be able to support higher frequencies. For example, if storage nodes of a nonrelational database service support a maximum key access frequency of 1,000 requests per second, then a storage node receiving more than 1,000 requests per second for any given key may generate throttling exception errors until the maximum threshold is no longer exceeded.

In some embodiments, in response to a storage node determining that a key is associated with an access frequency score that exceeds a defined "hotness" threshold (where the threshold may be less than the maximum key access frequency threshold), the key may be added to a "hot key" list managed by the storage node. The hot key list may thus represent a set of one or more keys potentially nearing the maximum request frequency limit. Using such hot key lists, for example, the storage nodes can send response messages that include identifiers of hot keys and associated access frequency scores (for example, either providing an access frequency score of a requested key nearing the maximum request frequency limit or providing an identifier of one or more keys with the highest access frequency scores in the case of a throttled request). Among other benefits, the monitoring and collection of key access pattern data enables users and client devices to better understand key access patterns for their nonrelational database tables, to identify "hot" keys that may lead to throttling and to take proactive actions to avoid such throttling, to more easily diagnose which keys are causing throttling exceptions to occur, and to analyze and view historical key access trend patterns.

Relational databases, which model data as rows and columns in a series of tables, have long been a dominant form of data organization and storage. However, various types of nonrelational databases as described above have become increasingly popular in recent decades. At a high level, a nonrelational database provides for the storage and retrieval of data using data structures other than the tabular relations traditionally used in relational database systems. For example, one type of nonrelational database is based on key-value data structures, where data is stored as a collection of key-value pairs such that each possible key appears at most once in a data collection. Records in such databases are then stored and retrieved using the keys that uniquely identify each record, where a record can in turn include various types of fields and associated data. Another similar nonrelational database structure is a document store, where each "document" stored in the database encapsulates and encodes data and is similarly addressed in the database via a unique key, among other possible types. For many types of applications and use cases, the characteristics of such nonrelational databases can greatly improve scalability and provide superior performance compared to traditional relational databases.

In some embodiments, a service provider network provides a nonrelational database service that enables users of the provider network to readily create and use nonrelational databases, where many of the associated tasks of hardware provisioning, database setup and configuration, throughput capacity planning, replication, and scaling can be managed in part or in whole by the service. Users can access their nonrelational databases using various interfaces provided by the nonrelational database service, for example, to create new tables, to modify table configurations, to put, get, update, and delete items stored in tables, and so forth. As indicated above, users generally can specify one or more items in a table to which an operation relates by specifying a unique key associated with each item.

In some embodiments, a nonrelational database service imposes various limits on the frequency with which various types of operations can be performed on data stored in nonrelational database tables. One such example limit may include a maximum frequency with which operations can be performed on a table as a whole. Another such limit may include a maximum frequency with which any key in a table can be accessed (for example, a nonrelational database service may impose a limit of 2,000 requests per second for any given key, or any other similar limit depending on the implementation). In this example, if requests specifying a particular key are received with a frequency that exceeds the imposed limit, the nonrelational database service may return an error message (for example, a throttling exception) for any additional requests until the frequency limit is no longer exceeded.

As indicated above, if a client device sends a request that is received by a storage node of a nonrelational database service at which a key access frequency limit has been exceeded, the storage node may return a response indicating that a throttling exception has occurred and that the request was therefore not processed. However, such throttling exception messages currently provide little additional information to the client device or user about the exact cause of the throttling exception (for example, whether a general throttling exception for the table occurred, or whether requests for the currently requested key or a different key is causing the throttling to occur, and so forth). Thus, it is often challenging for users or client applications to take appropriate corrective measures in response to occurrences of such throttling, or to take measures to prevent such throttling from occurring in the first place.

According to embodiments described herein, to enable users to better understand and monitor key access patterns, storage nodes of a nonrelational database service are configured to monitor and collect key access pattern metrics for requests received by the storage nodes, to identify "hot" keys that are associated with request frequencies exceeding a defined threshold, and to optionally return various types of key access information with responses to the devices from which the requests originate. This key access information can be provided to users and client applications so that various proactive actions can be taken, if needed (for example, by caching records associated with certain highly requested keys, or programmatically reducing request frequencies for highly requested keys, and so forth). Furthermore, if a request is throttled by a storage node, the storage node can return more detailed information indicating a reason for the request being throttled, for example, by identifying one or more keys that are currently exceeding or nearly exceeding the key access frequency limit. The key access information collected by the storage nodes can further be aggregated and analyzed across storage nodes to identify historical key access patterns of interest for entire nonrelational database tables, and further used to generate various visualizations and other data representations that enable users to better understand their applications' key access patterns over time.

FIG. 1 is a diagram illustrating an environment for monitoring and enabling access to information about key access patterns for nonrelational database tables managed by a nonrelational database service of a service provider network. In some embodiments, a nonrelational database service 102, as well as any number of other possible services, operate as part of a service provider network 100 and each comprise one or more software modules executed by one or more electronic devices at one or more data centers and geographic locations. User(s) using one or more electronic device(s) (which may be part of or separate from the service provider network 100) can interact with the various services of the service provider network 100 via one or more intermediate networks, such as the internet. In other examples, electronic device(s) 104 can interact with the various services programmatically and without user involvement.

A provider network 100 provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (for example, the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As indicated above, service provider networks have enabled developers and other users to more easily deploy, manage, and use a wide variety of computing resources, including nonrelational databases. The use of a nonrelational database service 102, for example, enables users to offload many of the burdens of hardware provisioning, setup and configuration, replication, clustering scaling, and other tasks normally associated with nonrelational database management. A nonrelational database service further enables users to scale up or scale down tables' throughput capacity with minimal downtime or performance degradation, and to monitor resource utilization and performance metrics, among other features. Users can easily deploy nonrelational databases for use in connection with a wide variety of applications such as, for example, online shopping carts, workflow engines, inventory tracking and fulfillment systems, and so forth.

In some embodiments, a nonrelational database created by a user of a service provider network 100 is composed of one or more tables, items, and attributes. A table is a collection of items, and each item is a collection of attributes. Primary keys are used to uniquely identify each item in a table, and secondary indexes can be used to provide additional querying flexibility if desired. For example, a user developing a contact management application may use a nonrelational database service to create a People table, where each item stored in the table represents a person managed by the application. The example People table may further include various attributes for each item such as, for example, a PersonID, LastName, FirstName, and so forth. In this example, the PersonID attribute may further serve as the primary key for the table, meaning that each record is associated with a unique value for the PersonID attribute. Other than the primary key, the People table generally may be schema-less, meaning that neither the attributes nor their data types need to be pre-defined.

As illustrated in the example above, when a table is created in a nonrelational database, in addition to a table name, a primary key of the table is specified. The primary key uniquely identifies each item in the table such that no two items can have the same key. In some embodiments, a nonrelational database supports at least two different kinds of primary keys: a partition key, composed of one attribute of the items in the table, or a composite primary key composed of two attributes. For a composite primary key, a first selected attribute may be referred to as the "partition key" and a second selected attribute referred to as the "sort key." In a table that uses a composite primary key, it's possible for two items to have a same partition key value, however, any two such items are then required to have distinct sort key values.

In some embodiments, a nonrelational database service 102 further enables the creation of secondary indexes on a table. A secondary index enables the querying of data stored in a table using an alternate key in addition to queries against the primary key. At least two different types of secondary indexes may be supported by a nonrelational database service including, for example, a global secondary index (an index with a partition key and sort key that can be different from those on the table) or a local secondary index (an index that has a same partition key as the table but a different sort key).

In some embodiments, a nonrelational database service 102 enables users to access and perform operations on data stored in a nonrelational database via an API. The API, for example, may include various operations used create and manage tables such as, for example, operations to create a new table (including the optional creation of one or more secondary indexes), to obtain table description information (including, for example, its primary key schema, throughput settings, index information, and so forth), to return the names of all tables in a list, to modify the settings of a table or its indexes, and to delete a table. The API operations may further include operations used to perform create, read, update, and delete (also known as "CRUD") actions on data in a table. Such operations may include, for example, writing items to a table, retrieving items from a table, updating one or more attributes of items in a table, and deleting items from a table.

In some embodiments, a nonrelational database service 102 stores the data for a nonrelational database created by a user in partitions located across one or more storage nodes (for example, the partition(s) 108 stored at storage nodes 110 in FIG. 1). A partition is an allocation of storage for a table. In some embodiments, the storage is backed by solid-state drives (SSDs) (for example, storage devices 112) and may be automatically replicated across multiple storage nodes 110 each located in an area that is isolated from other areas for the purposes of fault tolerance and stability. Furthermore, the partition management may be handled by the nonrelational database service 102 and without user involvement.

As indicated above, a primary key (whether it be a partition key or a composite primary key) is used to access records stored in a nonrelational database. In general, developers are advised to design applications such that accesses to the table are uniform across all primary keys in the table, if possible. In some embodiments, once traffic starts to be received by one or more storage nodes storing a nonrelational database table, a nonrelational database service 102 is configured to automatically support various access patterns so long as the access patterns do not exceed one or more defined throughput limits. In some embodiments, a nonrelational database service 102 can split users' workloads onto multiple partitions by automatically identifying keys that are receiving the most workload. If a user's database, for example, has two keys on a same partition that are both receiving a heavy workload, the service 102 can automatically split the partition across two or more storage nodes so that the active keys live on their own partition. However, as mentioned above, there nonetheless remains a limit to a frequency with which a storage node supports requests for a single key. In some embodiments, if the defined maximum frequency limit for a key is exceeded, the storage nodes return a throttling exception message and do not process the request.

In FIG. 1, it assumed that a user has created a nonrelational database table using the nonrelational database service 102. In some embodiments, when a table is created, initially the table is in a "creating" status during which the nonrelational database service 102 allocates sufficient partitions 108 to the table so that it can handle a user's provisioned throughput requirements. A user can begin writing and reading table data after the table status changes to an "active" status. In some embodiments, a nonrelational database service 102 allocates additional partitions to a table in at least the following situations: a user increases the table's provisioned throughput settings beyond what the existing partitions are able to support, or an existing partition fills to capacity and more storage space is needed. Once the table is created and active, users and client applications can begin sending requests to interact with data stored in the table.

At circle "1" in FIG. 1, one or more electronic devices 104 generate application traffic 114 (e.g., data plane traffic) that involves data items in one or more tables stored on the storage nodes 110. As indicated above, each table may be stored as a collection of one or more partitions 108 spread across one or more storage nodes 110. The application traffic 114, for example, can be generated by the electronic devices 104 as part of the devices' interaction with the created database (for example, to put, get, modify, and delete data items). The electronic devices 104 thus generally represent any type of client device that can communicate with the nonrelational database service 102 via a network including, for example, desktop computers, laptop computers, mobile devices, gaming devices, set-top boxes (STB), servers, and the like. The amount of traffic generated by the electronic devices 104 for a particular database, and for particular data items stored in a database, can vary over time in response to changes in the time of the day, day of the week, special events, overall popularity of an application or service using the database, or in response to any other conditions.

At circle "2," a request router receives the application traffic 114 and routes the traffic to storage nodes 110. In some embodiments, a request router 116 uses partition metadata 118 to identify, for a request identifying a particular key, a location of a partition 108 at a storage node 110 storing the data item identified by the key. Once the storage node 110 storing the relevant partition is identified, the request router 116 forwards the request to the identified storage node 110. In some embodiments, the request router 116 optionally further performs other request validation and authentication operations as part of processing and routing each request.

At circle "3," the storage nodes 110 process the application traffic received from the request router 116, including the manipulation of data stored by the storage nodes according to the requested operations, and further including the creation and management of one or more data structures used to collect metrics reflecting a frequency with which keys managed by the storage node are accessed (that is, a frequency with which individual keys are the subject of a request to get, put, update, etc., a record stored by the storage node). As described in more detail hereinafter, these data structures can be used to associate keys identifying records managed by a storage node with respective access frequency values, to identify keys associated with a respective access frequency value that exceeds a defined threshold (for example, a threshold used to identify "hot" keys), and to optionally publish key access metrics to other components of a service provider network 100 for further analysis.

In some embodiments, part of a storage node 110 processing a request includes calculating a number of read or write "units" consumed by the request. For example, each request may consume one or more units depending on the size of the record or item involved in the operation such that operations involving larger data items may consume more read or write units. As one example, an example nonrelational database service 102 may define one request unit as being able to process up to 4 kilobytes worth of data (or any other defined amount of data in other implementations). In this example, if a request is received to read an item that is 7 kilobytes in size, then two read units may be consumed to process the request. In some embodiments, a nonrelational database service 102 uses a "token bucket" concept to manage a rate at which requests can be processed according to a provisioned amount of capacity of read and/or write units. A token bucket, for example, can be filled with "tokens" at a certain constant rate, and each read or write unit consumes one token in the bucket. If enough tokens are available to process a received request, then the request is processed; otherwise, the storage node may throttle the request and only process new requests when additional tokens become available. In some embodiments, a frequency of key accesses is measured with respect to calculated read or write units; in other examples, key access frequency metrics can be based solely on the number of requests identifying each key.

Figure 2:
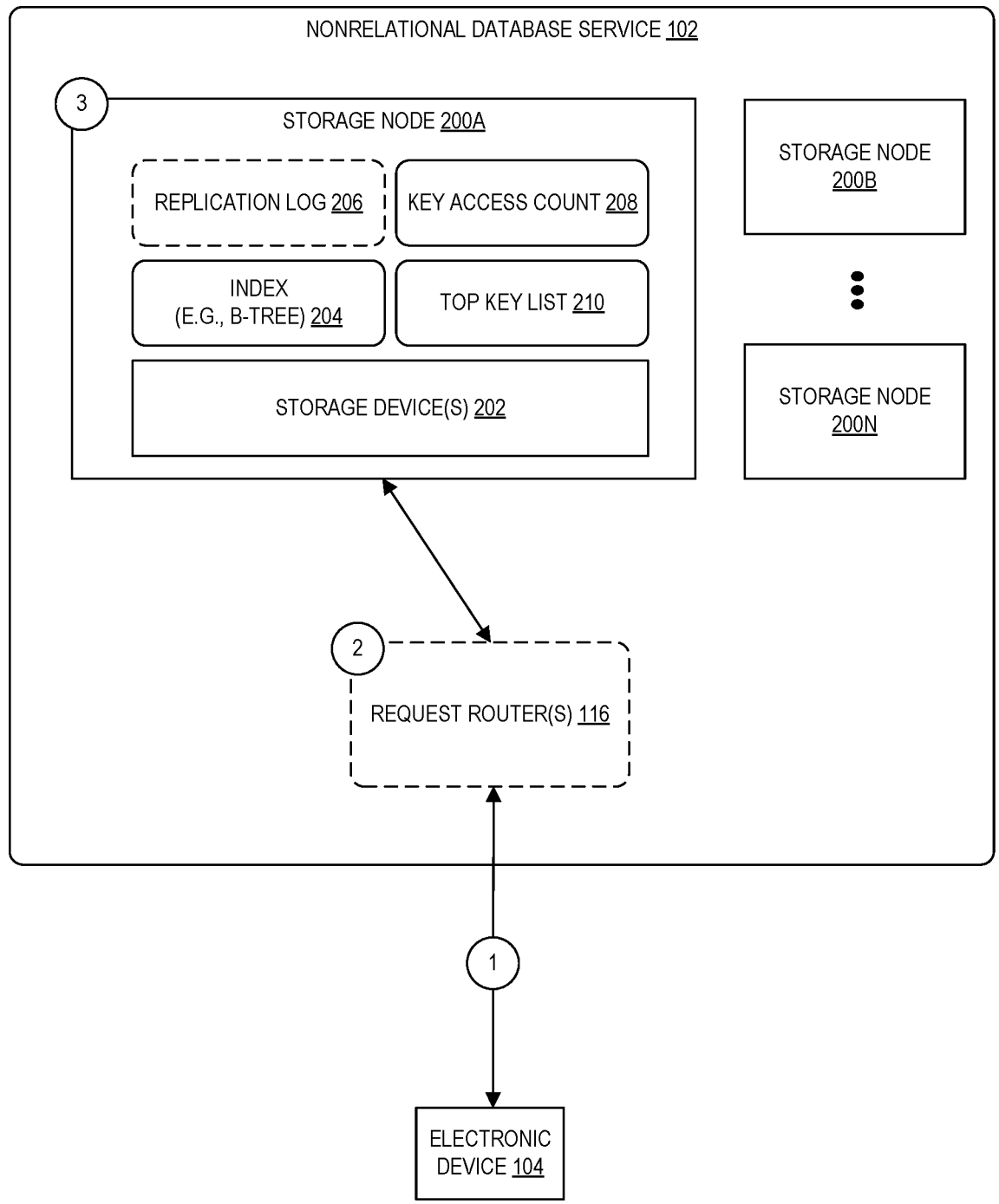
FIG. 2 is a diagram illustrating example components of a storage node of a nonrelational database service according to some embodiments.

FIG. 2 illustrates a storage node of a nonrelational database service and example data structures used by the storage node to monitor and collect data indicating key access patterns. As shown in FIG. 2, a storage node 200A includes storage device(s) 202, an index 204, and a replication log 206. In some embodiments, storage nodes of a nonrelational database service 102 further include a key access count 208 data structure and a hot key list 210. Similar components may be present at other storage nodes 200B-200N of the nonrelational database service 102.

In an embodiment, an index 204 is used to manage the data of a partition stored by the storage node 200A, for example, using a B-tree index or other data structure. The replication log 206 stores a record of past operations performed by the storage node (for example, puts, deletes, etc.). In an embodiment, a key access count 208 data structure tracks key access information for keys managed by the storage nodes. In one embodiment, a count-min sketch data structure is used is used, where a count-min sketch represents a probabilistic data structure that can serve as a frequency table of key accesses in a stream of requests received by a storage node 200A. In other embodiments, other types of frequency counting algorithms for data streams can be used. In general, a count-min sketch or other data structure consumes a series of requests received by the storage node 200A for a partition and counts or estimates the frequency with which each key is the subject of a request (or in other examples a number of read or write units consumed for each key per unit of time).

In some embodiments, based on tracking the frequency of the key accesses using a key access count 208 data structure, a hot key list 210 is further maintained to track the top N keys that were accessed in the last minute (or other timeframe), for example, or to track any number of keys with a frequency that exceeds a defined threshold (for example, a "hot key" threshold). The number of keys, N, stored in the hot key list 210 can vary depending on an amount of space available to store such information on a storage node 200A, or based on any other desired criteria.

As indicated above, a key access count 208 data structure and a hot key list 210 can be used to maintain information about keys that have been frequently accessed in a past time window. In some embodiments, a storage node 200A can maintain other information about key accesses such as moving averages or other calculations that can be used, for example, to identify keys that remain "hot" for sustained periods of time, keys that are hot only in short and possibly periodic bursts, or keys that follow other access patterns of interest. In some embodiments, a threshold used to define when a key is "hot" can be pre-defined by the nonrelational database service 102, customized by a user of the service 102, adaptive to a particular user's key access patterns, or based on any combinations thereof.

Figure 3:
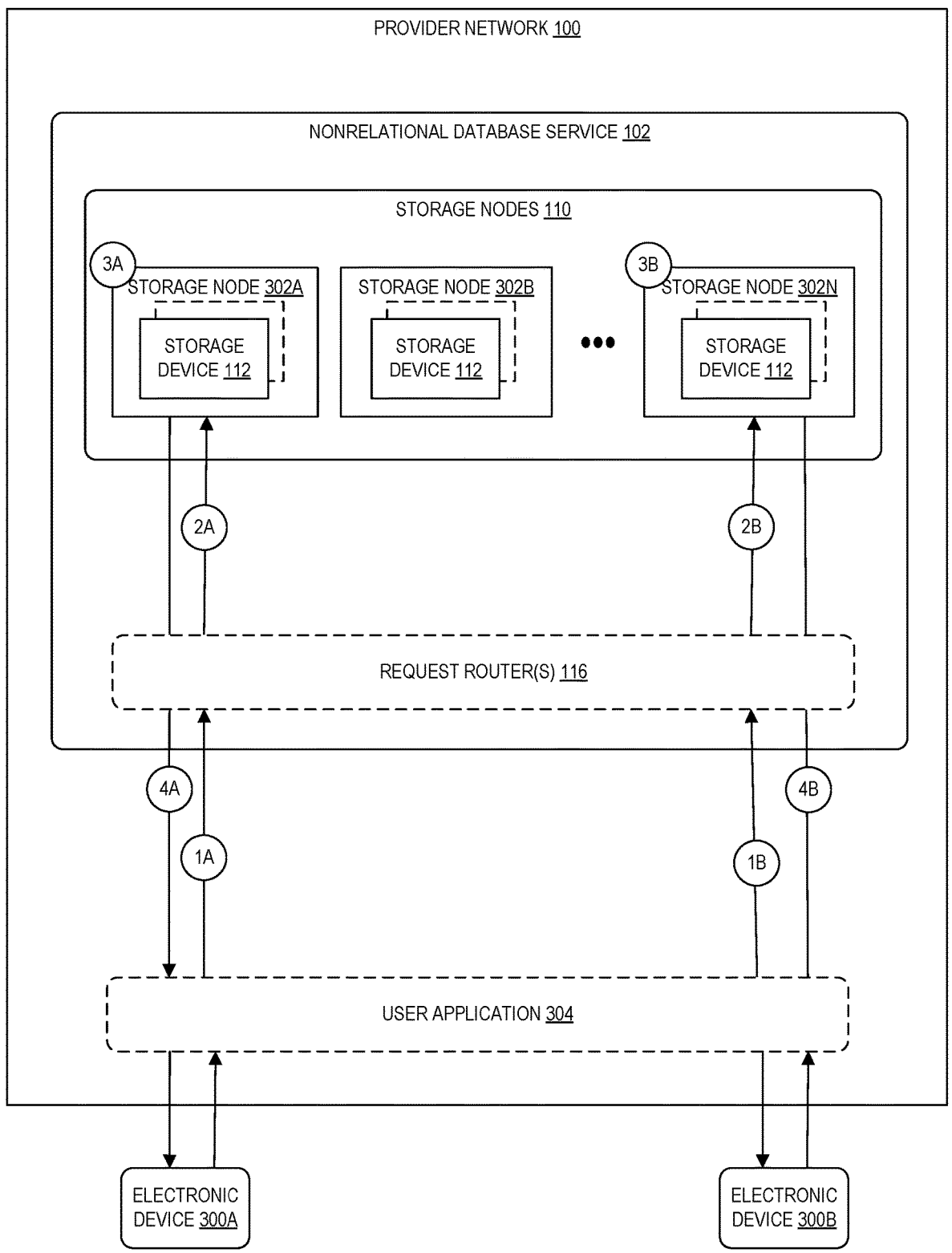
FIG. 3 is a diagram illustrating example request-response patterns including the exchange of "hot key" information associated with partitions of a nonrelational database managed by a nonrelational database service according to some embodiments.

FIG. 3 illustrates different types of response messages that can be provided by storage nodes of a nonrelational database service in response to requests associated with respective keys. At circle "1A" in FIG. 3, for example, a request is sent from a client device 300A that is routed by a request router 116 to a storage node 302A at circle "2A". For example, the request may be any type of data plane call such as a request to "get," "put" or "update" an item that is stored in a partition managed by the storage node 302A.

As illustrated in FIG. 3, the requests may be generated in part by a user application 304 that uses one or more nonrelational database tables as a backend data store. In this example, the requests may be generated on behalf of different users of the user application 304 in response to various types of user interactions with the user application 304 (for example, based on interactions with the user application 304 by a first user associated with electronic device 300A and separately by a second user associated with electronic device 300B). In such situations, if the first user's interactions with the user application 304 cause the application to exceed one or more throttling limits at the nonrelational database service 102, the second user's experience may be degraded if the second user has data residing on the same storage nodes as the first user. Thus, it may be beneficial for the user application 304 to obtain information indicating whether access to certain keys is in danger of exceeding any access frequency limits, as described herein, so that the application 304 can take action to avoid such resultant throttling from impacting other users of the application 304 (for example, by caching records associated with heavily accessed keys).

In some embodiments, requests generated by electronic devices optionally include a parameter indicating that the requesting user or application desires key access information to be returned with the response under certain circumstances (for example, when the key that is the subject of the request is determined to be a hot key, or if a throttling exception is returned). In this manner, key access information can be provided to requesting devices on an "opt-in" basis to avoid causing issues with requesting applications that may not be expecting the presence of the key access information in response messages. In other examples, key access information can be returned by default and without the need for requests to include any specific parameter or for users to opt-in.

In FIG. 3, at circle "3A," the storage node 302A receiving the request determines that the request can be successfully performed (for example, because the number of read or write units needed to process the request will not cause the storage node to exceed any applicable limits) and further determines that the requested key is a hot key (for example, because the key is present in the hot keys list managed by the storage node, as described above in reference to FIG. 2, or because an access frequency score associated with the key exceeds a defined threshold). In some embodiments, in response to determining that the requested key is a hot key, at circle "4A," a response is generated and sent that includes a frequency score attribute indicating a relative "hotness" of the key. In some embodiments, the frequency score attribute is returned only if the score exceeds a defined hotness threshold (for example, half of the maximum frequency limit). In some embodiments, the frequency score included with the attribute is calculated as a normalized value (for example, a number between 0 and 1) relative to the maximum access frequency limit. For example, if a key is currently being accessed with a frequency of 750 requests per second and the maximum frequency limit is 1,000 requests per second, then a normalized frequency score for the key may be calculated as 0.75 (which may exceed a defined hotness threshold of 0.5). In general, if a response message indicates that a requested key is currently hot, the requesting user or application can optionally take one or more actions to minimize the chance that the key ends up causing a throttling exception, for example, by caching the record associated with the key, throttling a number of requests associated with the key at the client application, or performing any other such actions.

In some embodiments, other calculations can be used to obtain a frequency score for keys managed by a storage node. Another example is that the frequency score for a key on a storage node can be calculated as a normalized value based on a total number of read capacity unit or write capacity units consumed by all keys in the partition (for example, such that all keys on a partition are associated with a same access frequency score). In some embodiments, a harmonic mean calculation can be used that is based on both an access frequency score calculated for a partition as a whole and an access frequency for particular keys. For example, assume that a first key is being accessed at a frequency of 100 requests per second, a second key is being accessed with a frequency of 20 requests per second, and that the maximum frequency limit is 3,000 requests per second. In this example, an access frequency calculation for the first key can be calculated as: 2*((120/3,000)*(100/3,000))/((120/3,000)+(100/3,000)).

The following is an example excerpt from a return object in the case that a request is successfully processed by a storage node and the associated key is identified as a hot key:

```
{
    "ConsumedCapacity": {
        "CapacityUnits": 0,
        "ReadCapacityUnits": 1,
        "Table": {
            "CapacityUnits": 1,
            "ReadCapacityUnits": 1,
            "WriteCapacityUnits": 0
        },
        "TableName": "People",
        "WriteCapacityUnits": 0
    },
    "FrequencyScore": 0.6,
    ...
    # Other return fields.
}
```

As shown above, the response message includes a "FrequencyScore" attribute and an associated frequency score value indicating that the requested key is currently at 0.6, which may exceed a defined threshold for hot keys.

FIG. 3 further illustrates an example of a request that results in a throttling exception message being returned by a storage node (for example, either because the requested key currently exceeds a maximum frequency limit, or because one or more other keys in the table have exceeded the request frequency limit). Similar to above, an electronic device 300B generates a request specifying a key identifying a record stored in a partition managed by a storage node 302N, and a request router 116 thus routes the request to the storage node at circle "2B."

At circle "3B," the storage node 302N determines that the request cannot be satisfied because the request for the key exceeds a defined key access frequency limit, or because requests for another key in the partition has exceeded the limit, and at circle "4B" the storage node 302N returns a message via the request router 116 including a throttling exception. In some embodiments, the response message further includes key access frequency information indicating the keys currently being accessed with the greatest frequency, thereby providing an indication of which one or more keys are causing the throttling exception to occur (whether it be the same key as that included in the request at circle "1B" or one or more other keys requested in other requests).

The following is an example excerpt from a return object in the case of a storage node returning a throttling exception message:

```
{
    "message": "Your request rate is too high.",
    # Hot key access information
    "Key AccessMetrics": {
        "IsTemporary": true,
        "MostAccessedKey":
        {
            "PartitionKey": "hash_key_3",
            "SortKey": "sort_key1"
        }
    }
}
```

As shown above, the message includes information indicating that the request is being throttled and further includes a "KeyAccessMetrics" providing additional information about one or more hot keys associated with the partition. For example, the "KeyAccessMetrics" includes a "MostAccessedKey" attribute that includes information about one or more keys currently associated with a highest access frequency. In some embodiments, the response information further includes an "IsTemporary" attribute indicating whether the throttling is temporary, for example, because the partition can be split to avoid additional throttling, or whether the throttling is occurring because of a single key exceeding a frequency limit.

Figure 4:
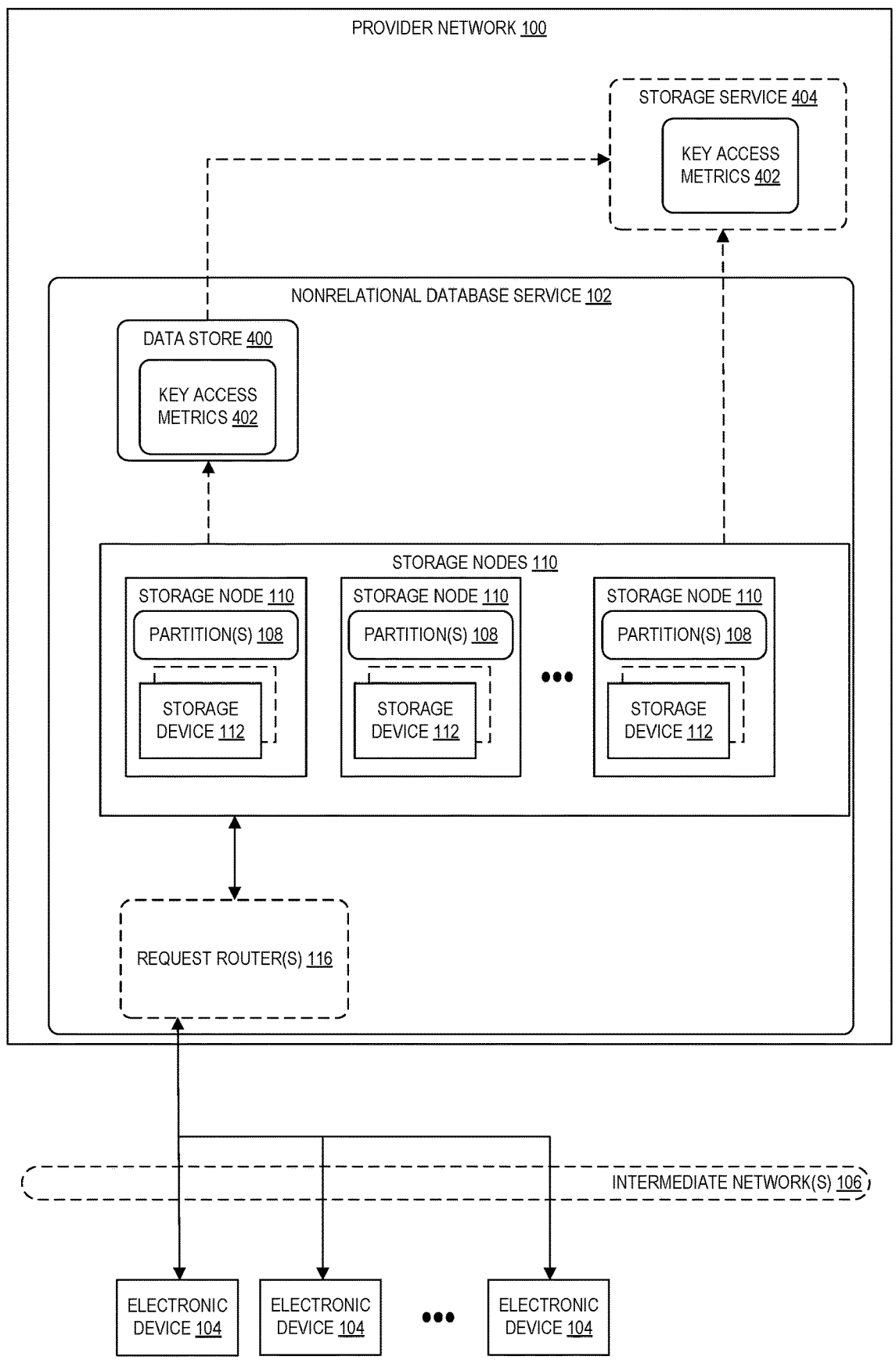
FIG. 4 is a diagram illustrating example processes for publishing key access metrics collected by storage nodes to other components of a service provider network according to some embodiments.

FIG. 4 illustrates the publishing of key access pattern metrics by storage nodes of a nonrelational database service to other components of a provider network according to embodiments. For example, in addition to being able to provide access to key access frequency information in response messages, storage nodes of a nonrelational database service can periodically publish key access metrics to other components of a service provider network 100 for further analysis of historical key access patterns. This information may be useful to users, for example, to help diagnose past performance issues, to understand seasonality and other trends with respect to various records within a database, among other uses.

As illustrated in FIG. 4, for example, storage nodes 110 may periodically publish key access frequency metrics to a data store 404 managed by the nonrelational database service 102, to storage service that is external to the nonrelational database service 102, or to any other suitable storage location or combination thereof. In some embodiments, the publishing of key access frequency metrics may be optional and performed only if an associated user opts in; in other examples, such metrics may be published automatically and without user involvement. In some embodiments, the data may be stored as key access metrics 402 in a suitable data storage format (for example, in one or more database tables, files, or any other data structure). In some embodiments, a storage location at a storage service 404 may be specified by a user of the nonrelational database service 102 and associated with the user's account, such that the user can have direct access to the key access metrics 402. As illustrated in FIG. 4, the published key access metrics can be collected from any number of separate data nodes, such that a global view of hot keys for a table can be obtained across any number of separate partitions.

In an embodiment, users can optionally access published key access pattern metrics using a "describe hot keys" API action provided by the nonrelational database service 102. The information returned by the nonrelational database service, for example, can include an indication of hot keys associated with a table across a certain time frame (for example, over the past day, wee, or month). In some embodiments, a centralized component within the nonrelational database service 102 can be configured to receive the published metrics from any number of separate storage nodes and to aggregate the information for particular tables so that such information can be provided upon request. In some embodiments, a describe hot keys API can further be used to obtain and aggregate information about hot keys associated with secondary indexes, where such indexes may refer to records stored across multiple separate storage nodes.

Figure 5:
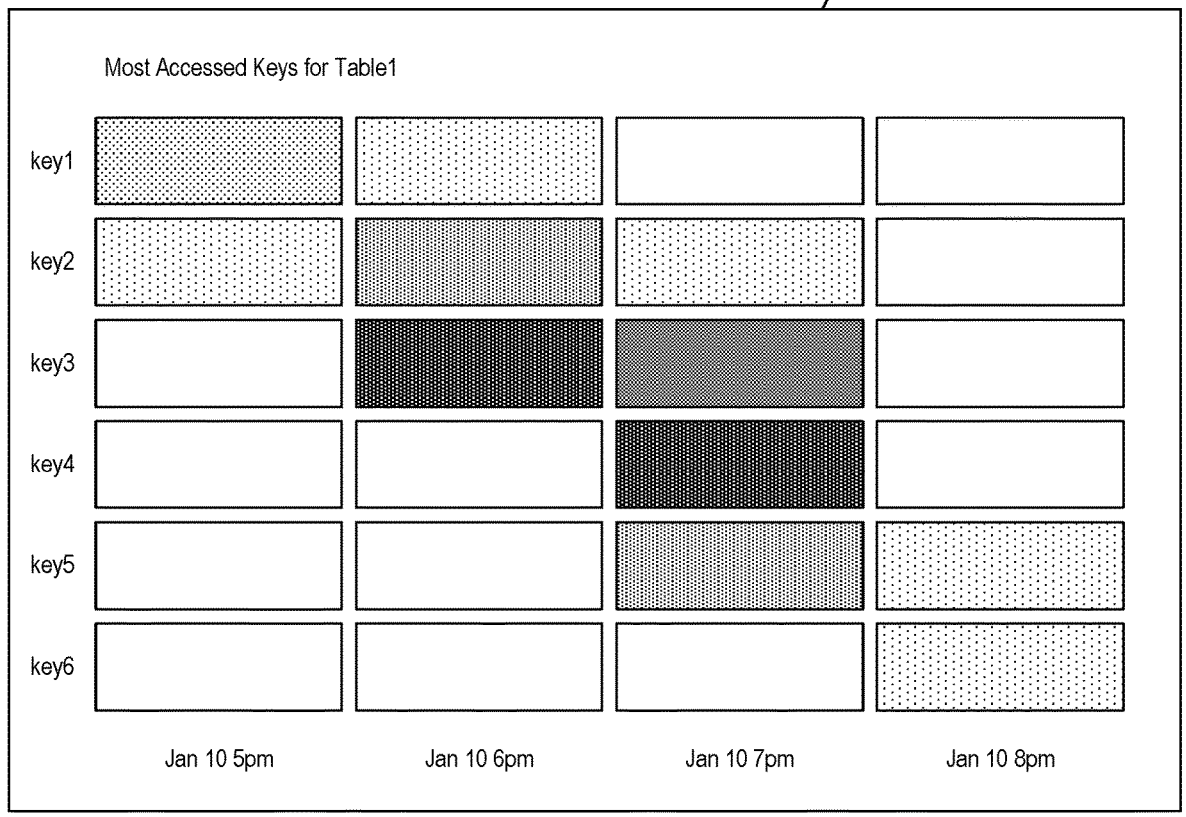
FIG. 5 is a diagram illustrating an example visualization of hot key information collected from one or more storage nodes of a nonrelational database service according to some embodiments.

In some embodiments, a nonrelational database service 102 further provides various graphical user interfaces (GUIs) that enable users to view visualizations and other graphical representations of hot key information for users' nonrelational database tables. FIG. 5 illustrates an example of a graphical heat map visualization showing key access patterns over time according to some embodiments. For example, a key access pattern heat map 500 includes a tabular view of the frequency with which some number of most accessed keys were accessed over some period of time (for example, over the past day, week, or month). As shown, keys that were accessed more frequency than others during certain timeframes are displayed using heat map cells with greater degrees of shading (or using different colors or any other visual elements to distinguish the cells). In some embodiments, users can select certain portions of the heat map to drill up or down into other timeframes (for example, by selecting a region representing a day of the week to show a breakdown of key access frequencies for hours within the selected day, and so forth).

Figure 6:
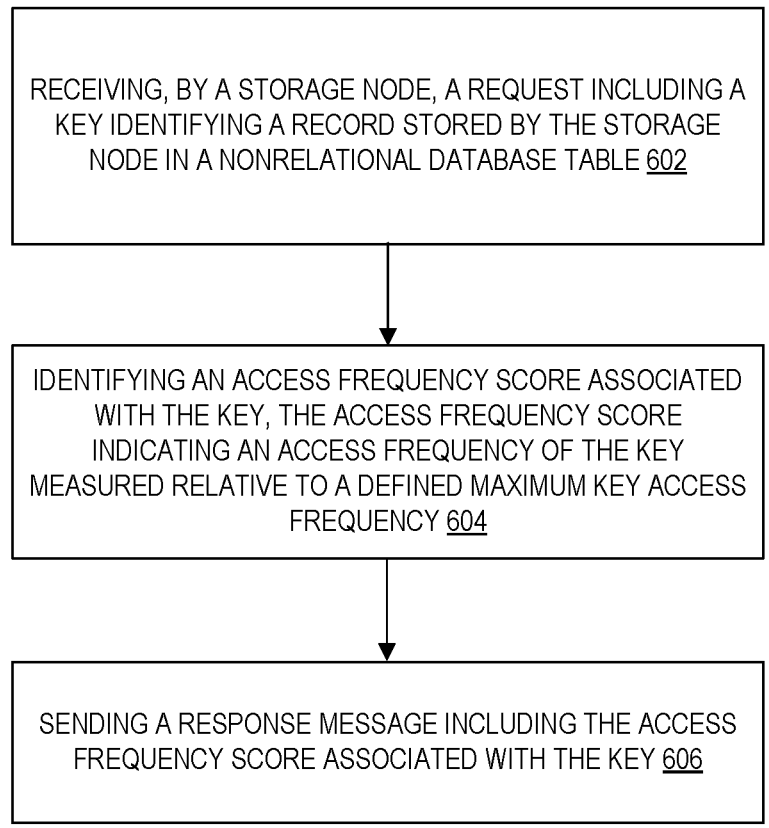
FIG. 6 is a flow diagram illustrating operations of a method for monitoring and enabling access to information about key access patterns for nonrelational database tables managed by a nonrelational database service of a service provider network according to some embodiments.

FIG. 6 is a flow diagram illustrating operations 600 of a method for monitoring and enabling access to information about key access patterns for nonrelational database tables managed by a nonrelational database service of a service provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by storage nodes of the other figures.

The operations 600 include, at block 602, receiving, by a storage node, a request including a key identifying a record stored by the storage node in a nonrelational database table. In some embodiments, the request indicates an operation to perform on the record stored by the storage node, and wherein the key is a unique identifier of the record within the nonrelational database table. In some embodiments, the key is one of: a partition key, or a composite key comprising a partition key and a sort key.

The operations 600 further include, at block 604, identifying an access frequency score associated with the key, the access frequency score indicating an access frequency of the key measured relative to a defined maximum key access frequency. In some embodiments, the access frequency score is calculated as a normalized value relative to the defined maximum key access frequency. In some embodiments, the storage node measures an access frequency associated with a plurality of keys managed by the storage node using a count-min sketch data structure. In some embodiments, the operations further include determining that the access frequency score exceeds a defined threshold indicating that the key is a hot key. In some embodiments, the storage node calculates a number of read units or write units used to process the request, and the access frequency score is based at least in part on the calculated number of read units or write units. In some embodiments, the access frequency score associated with the key is further calculated based at least in part on an access frequency score for the partition of which the key is a part (for example, using a harmonic mean calculation).

The operations 600 further include, at block 606, sending a response message including the access frequency score associated with the key. In some embodiments, the operations further include determining that the request does not exceed a defined maximum access frequency limit, and generating the response message including the access frequency score for the key.

In some embodiments, the operations 600 further include periodically sending, by the storage node, historical key access data to another component of a service provider network of which the nonrelational database service is a part, the historical key access data reflecting historical key access metrics associated with each of a plurality of keys managed by the storage node.

In some embodiments, the operations further include causing display of a graphical user interface (GUI) including a visualization that displays historical key access pattern metrics associated with the nonrelational database table, the historical key access pattern metrics including metrics associated with a plurality of keys managed by a plurality of storage nodes including the storage node.

In some embodiments, the request is a first request, and the key is a first key, and the record is a first record, the operations further include: receiving a second request including a second key identifying a second record stored by the storage node in a nonrelational database table, determining that the second request is to be throttled, identifying a third key associated with a highest access frequency score at the storage node, and sending a throttling exception message identifying the third key and the highest access frequency score.

Figure 7:
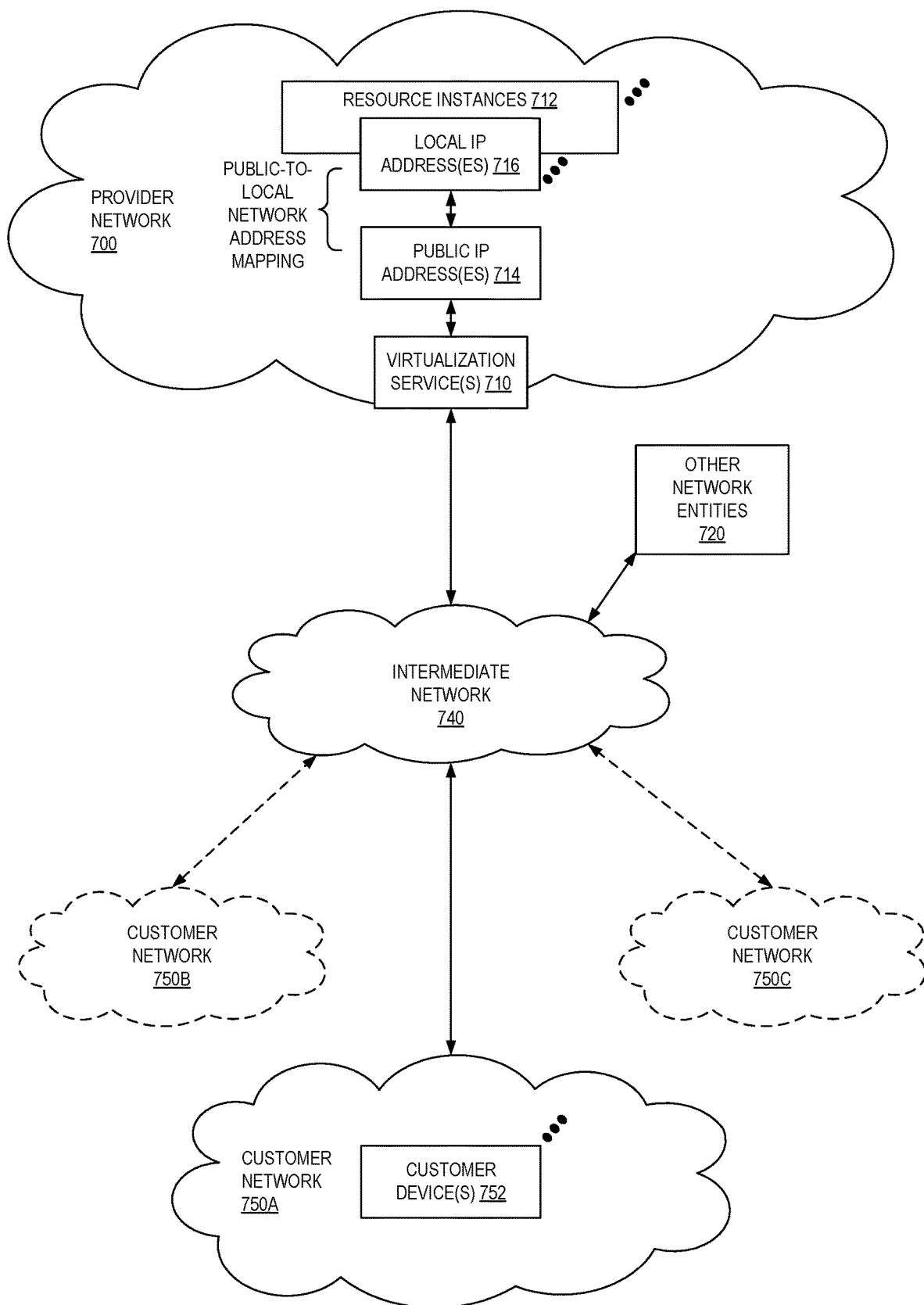
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
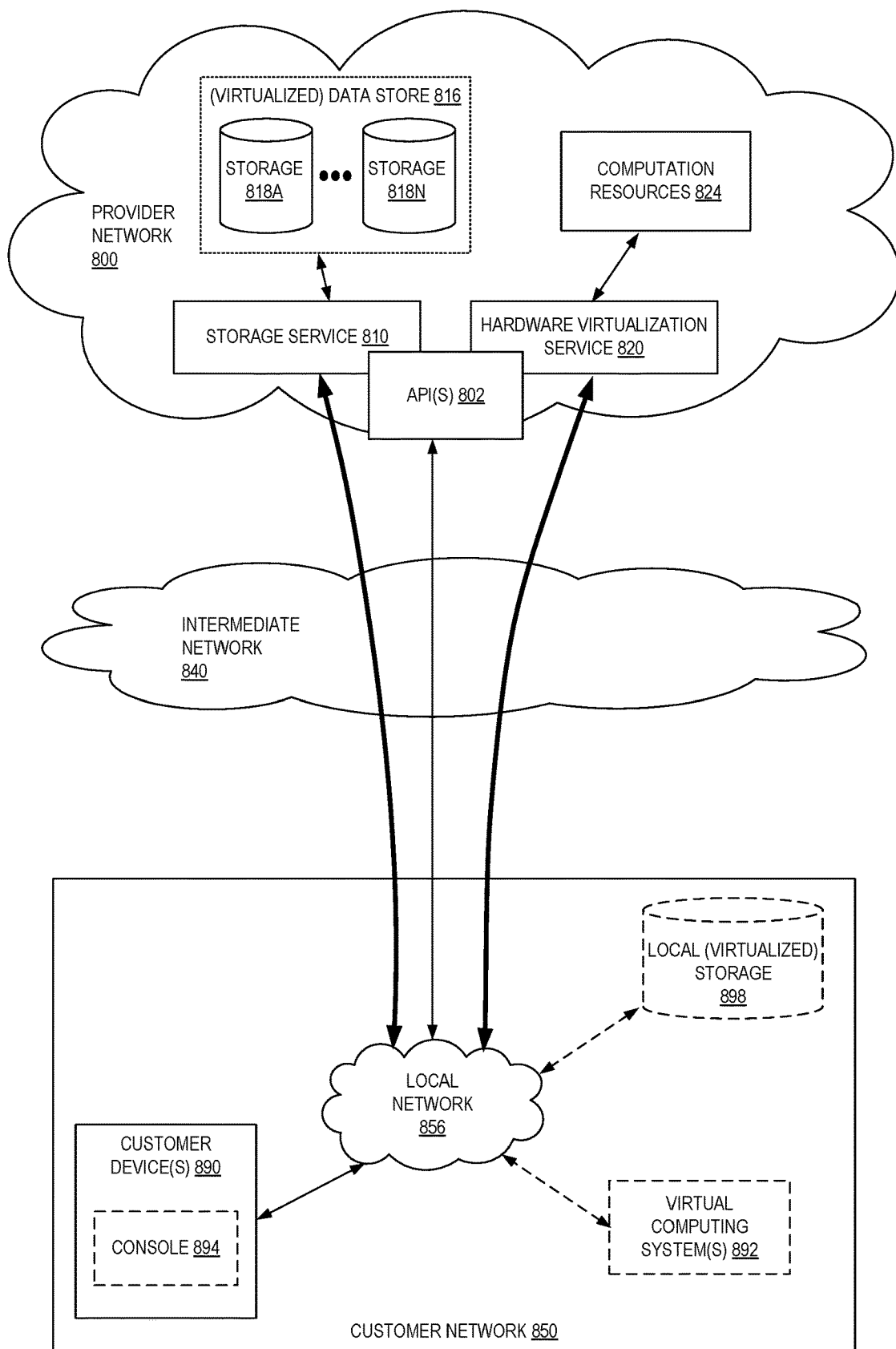
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
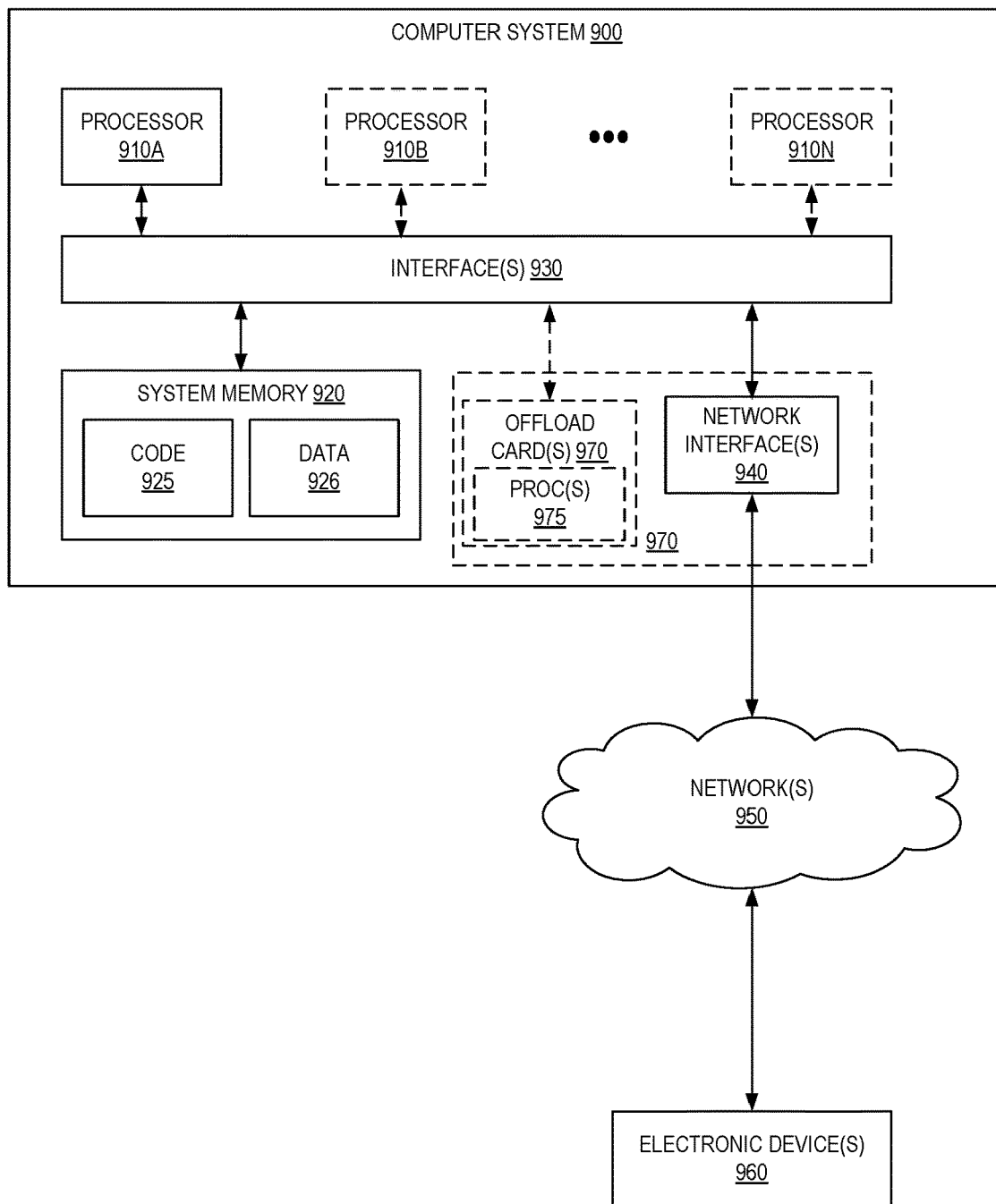
FIG. 9 is a block diagram illustrating an example computer system that may be used in some embodiments.

In some embodiments, a system that implements a portion or all of the techniques for monitoring and enabling access to information about key access patterns for nonrelational database tables managed by a nonrelational database service of a service provider network as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a storage node managed by a nonrelational database service, a request to perform an operation associated with a record stored by the storage node in a nonrelational database table, wherein the record is identified by a key that is unique within the nonrelational database table;
determining that the key is associated with an access frequency score that exceeds a defined threshold, the access frequency score indicating an access frequency of the key measured relative to a defined maximum key access frequency; and
sending a response message including the access frequency score.

2. The computer-implemented method of claim 1, further comprising periodically sending, by the storage node, historical key access data to another component of a service provider network of which the nonrelational database service is a part, the historical key access data reflecting historical key access metrics associated with each of a plurality of keys managed by the storage node.

3. The computer-implemented method of claim 1, further comprising causing display of a graphical user interface (GUI) including a visualization that displays historical key access pattern metrics associated with the nonrelational database table, the historical key access pattern metrics including metrics associated with a plurality of keys managed by a plurality of storage nodes including the storage node.

4. A computer-implemented method comprising:
receiving, by a storage node, a request including a key identifying a record stored by the storage node in a nonrelational database table;
identifying an access frequency score associated with the key, the access frequency score indicating an access frequency of the key measured relative to a defined maximum key access frequency; and
sending a response message including the access frequency score associated with the key.

5. The computer-implemented method of claim 4, further comprising periodically sending, by the storage node, historical key access data to another component of a service provider network of which a nonrelational database service is a part, the historical key access data reflecting historical key access metrics associated with each of a plurality of keys managed by the storage node.

6. The computer-implemented method of claim 4, further comprising causing display of a graphical user interface (GUI) including a visualization that displays historical key access pattern metrics associated with the nonrelational database table, the historical key access pattern metrics including metrics associated with a plurality of keys managed by a plurality of storage nodes including the storage node.

7. The computer-implemented method of claim 4, further comprising:
determining that the request does not exceed a defined maximum access frequency limit; and
generating the response message including the access frequency score for the key.

8. The computer-implemented method of claim 4, wherein the request is a first request, the key is a first key, and the record is a first record, the method further comprising:
receiving a second request including a second key identifying a second record stored by the storage node in a nonrelational database table;
determining that the second request is to be throttled by the storage node;
identifying a third key associated with a highest access frequency score at the storage node; and
sending a throttling exception message identifying the third key.

9. The computer-implemented method of claim 4, wherein the access frequency score is calculated as a normalized value relative to the defined maximum key access frequency.

10. The computer-implemented method of claim 4, wherein the request indicates an operation to perform relative to the record stored by the storage node, and wherein the key is a unique identifier of the record within the nonrelational database table.

11. The computer-implemented method of claim 4, further comprising receiving, by a nonrelational database server managing the nonrelational database, a request specifying the defined maximum key access frequency to be used for the nonrelational database table.

12. The computer-implemented method of claim 4, further comprising determining that the access frequency score exceeds a defined threshold indicating that the key is a hot key, wherein the response message including the access frequency score associated with the key is sent in response to determining that the key is a hot key.

13. The computer-implemented method of claim 4, further comprising calculating a number of read capacity units or write capacity units to be used to process the request, wherein the access frequency score is based at least in part on the calculated number of read capacity units or write capacity units.

14. The computer-implemented method of claim 4, wherein the access frequency score associated with the key is further calculated based at least in part on an access frequency score for a partition of which the key is a part.

15. A system comprising:
a request router of a nonrelational database service implemented by a first one or more electronic devices, the request router including first instructions that upon execution cause the request router to:
receive a request to perform an operation associated with a record stored in a partition of a nonrelational database table, the record identified in the request by a key that is unique within the nonrelational database table,
identify a storage node storing the partition of the nonrelational database table, and send the request to the storage node; and
a storage node of the nonrelational database service implemented by a second one or more electronic devices, the storage node including second instructions that upon execution cause the storage node to:
receive the request,
determine that the key is associated with an access frequency score that exceeds a defined threshold, the access frequency score indicating an access frequency of the key measured relative to a defined maximum key access frequency, and
send a response message including the access frequency score.

16. The system of claim 15, wherein the second instructions upon execution further cause the storage node to periodically send historical key access data to another component of a service provider network of which the nonrelational database service is a part, the historical key access data reflecting historical key access metrics associated with each of a plurality of keys managed by the storage node.

17. The system of claim 15, further comprising causing display of a graphical user interface (GUI) including a visualization that displays historical key access pattern metrics associated with the nonrelational database table, the historical key access pattern metrics including metrics associated with a plurality of keys managed by a plurality of storage nodes including the storage node.

18. The system of claim 15, wherein the access frequency score is calculated as a normalized value relative to the defined maximum key access frequency.

19. The system of claim 15, further comprising receiving, by the nonrelational database service managing the nonrelational database, a request specifying the defined maximum key access frequency to be used for the nonrelational database table.

20. The system of claim 15, further comprising calculating a number of read capacity units or write capacity units to be used to process the request, wherein the access frequency score is based at least in part on the calculated number of read units or write units.

* * * * *